United States Patent
Andrei et al.

(10) Patent No.: US 10,496,319 B2
(45) Date of Patent: Dec. 3, 2019

(54) LIFECYCLE MANAGEMENT FOR DATA IN NON-VOLATILE MEMORY INCLUDING BLOCKING CREATION OF A DATABASE SAVEPOINT AND ASSOCIATING NON-VOLATILE MEMORY BLOCK IDENTIFIERS WITH DATABASE COLUMN FRAGMENTS

(71) Applicant: SAP SE, Walldorf (DE)

(72) Inventors: Mihnea Andrei, Issy les Moulineaux (FR); Muhammed Sharique, Pune (IN); Surendra Vishnoi, Pune (IN); Rolando Blanco, Ontario (CA)

(73) Assignee: SAP SE, Walldorf (DE)

( * ) Notice: Subject to any disclaimer, the term of this patent is extended or adjusted under 35 U.S.C. 154(b) by 25 days.

(21) Appl. No.: 15/584,626

(22) Filed: May 2, 2017

(65) Prior Publication Data
US 2018/0246807 A1    Aug. 30, 2018

(30) Foreign Application Priority Data
Feb. 28, 2017 (IN) .............................. 201741007010

(51) Int. Cl.
*G06F 3/06* (2006.01)
*G06F 16/27* (2019.01)
(Continued)

(52) U.S. Cl.
CPC .......... *G06F 3/0649* (2013.01); *G06F 3/0604* (2013.01); *G06F 3/0646* (2013.01);
(Continued)

(58) Field of Classification Search
CPC ............... G06F 12/0238; G06F 3/0649; G06F 17/30073; G06F 17/30575; G06F 17/30;
(Continued)

(56) References Cited

U.S. PATENT DOCUMENTS

| | | | |
|---|---|---|---|
| 2014/0136473 A1* | 5/2014 | Faerber | G06F 17/30315 707/607 |
| 2014/0281212 A1* | 9/2014 | Schreter | G06F 3/0674 711/112 |

(Continued)

OTHER PUBLICATIONS

Oukid, Ismail et al. "Instant Recovery for Main-Memory Databases", 7th Biennial Conference on Innovative Data System Research (CIDR'15), Jan. 4-7, 2015, Asilomar, California, USA, 9pgs.

(Continued)

*Primary Examiner* — Glenn Gossage
(74) *Attorney, Agent, or Firm* — Buckley, Maschoff & Talwalkar LLC

(57) ABSTRACT

Systems and methods for integrating the lifecycle of non-volatile memory blocks with the transactional guarantees of a database are disclosed. One method includes creating a first fragment of a first database column in a volatile memory system, receiving a first pointer to a first block of a second non-volatile memory (NVM) system, the first block associated with the first fragment of the first database column, and populating the first block of the second non-volatile memory system using the first pointer. The method further includes committing the first block of the second non-volatile memory system and associating a first block identifier of the first block of the second non-volatile memory system with the first fragment of the first database column, while blocking creation of a database savepoint, and then unblocking creation of the database savepoint. A block key associated with a first fragment may comprise various identifiers such as block, column, table and partition identifiers. A first fragment may be a main column fragment and comprise a first dictionary such as sorted dictionary, while a second fragment may be a delta column fragment and comprise a second dictionary, which may be a non-sorted dictionary.

22 Claims, 9 Drawing Sheets

(51) Int. Cl.
*G06F 16/11* (2019.01)
*G06F 16/21* (2019.01)
*G06F 16/901* (2019.01)
*G06F 12/02* (2006.01)
*G11C 11/56* (2006.01)
*G06F 16/00* (2019.01)

(52) U.S. Cl.
CPC ........ G06F 3/0679 (2013.01); G06F 12/0246 (2013.01); G06F 16/113 (2019.01); G06F 16/211 (2019.01); G06F 16/27 (2019.01); G06F 16/901 (2019.01); G11C 11/5628 (2013.01); *G06F 16/00* (2019.01)

(58) Field of Classification Search
CPC ......... G06F 2212/10; G06F 2212/1016; G06F 2212/1024; G06F 2212/202
See application file for complete search history.

(56) References Cited

U.S. PATENT DOCUMENTS

| 2016/0147786 | A1* | 5/2016 | Andrei | G06F 17/30368 |
| | | | | 707/695 |
| 2017/0364554 | A1* | 12/2017 | Nica | G06F 17/30321 |
| 2018/0246809 | A1* | 8/2018 | Rebholz | G06F 3/0604 |
| 2018/0260286 | A1* | 9/2018 | Roterring | G06F 11/1469 |

OTHER PUBLICATIONS

Oukid, Ismail et al. "SOFORT: A Hybrid SCM-DRAM Storage Engine for Fast Data Recovery", DaMON'14, Jun. 22-27, 2014, Snowbird, UT, USA, ACM 978-1-4503-2971-2/14/06, http://dx.doi.org/10.1145/2619228.2619236, 7pgs.

* cited by examiner

_US 10,496,319 B2_

LIFECYCLE MANAGEMENT FOR DATA IN NON-VOLATILE MEMORY INCLUDING BLOCKING CREATION OF A DATABASE SAVEPOINT AND ASSOCIATING NON-VOLATILE MEMORY BLOCK IDENTIFIERS WITH DATABASE COLUMN FRAGMENTS

CROSS-REFERENCE TO RELATED APPLICATIONS

This application is related to, and claims benefit of and priority to, Indian Provisional Patent Application No. 201741007010, filed Feb. 28, 2017, the contents of which are hereby incorporated by reference in their entirety for all purposes.

BACKGROUND

Non-Volatile Memory (NVM) provides an intermediate alternative between high-performance Dynamic Random Access Memory (DRAM) and cost-effective hard disk drives (HDDs). Generally, the read performance of NVM is similar to DRAM and the write performance of NVM is significantly faster than HDDs. NVM is byte-addressable and writes to NVM are durable, so database data stored therein may be accessed directly after a crash and restart. Conventionally, restart would require reloading such database data from hard disk into DRAM.

In order to replace DRAM with NVM for the storage of certain database data structures, the creation, population and persistence of a new data structure should trigger the creation and population of a new NVM block. When the data structure is no longer needed, the removal of the data structure should trigger the removal of its NVM block. A further challenge presented by the storing of database data structures in NVM is the integration of the lifecycle of the NVM blocks, which have their own persistence mechanism, with the transactional guarantees of the database, which may be implemented based on savepoints and redo/undo logging.

DETAILED DESCRIPTION

Figure 1:
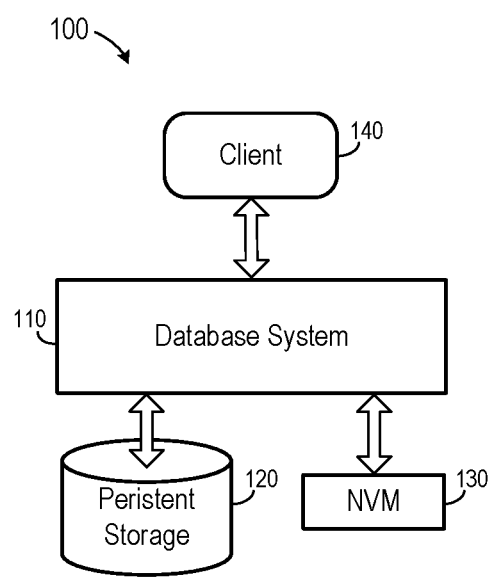
FIG. 1 is a block diagram of a system including a database system, persistent storage, and NVM according to some embodiments.

According to some embodiments, a data structure whose data is stored in NVM dictates the lifecycle of the NVM block which stores its data. For example, if the lifecycle of a data structure is driven by delta merges and Data Description Language (DDL) statements (i.e., DDLs), these delta merges and DDLs drive the lifecycle of any NVM blocks associated with the data structure. Moreover, a savepoint which truncates the REDO log physically deletes any logically-deleted NVM blocks. In this regard, a savepoint is a mechanism for copying in-memory modifications to a data structure onto disk such that those modifications are persisted.

Data structures determine the way data is organized in memory. Data structures are commonly created and populated in memory, and once populated, data structures may be persisted on disk. Once persisted on disk, a data structure can be destroyed from memory when not needed. Therefore, if the data structure is again needed in memory at a future time, the data structure can be reconstructed from the information persisted on disk. "Loading" a data structure refers to the reconstruction of a data structure in memory from the information persisted on disk. The representation of the data structure on disk may not match the representation in memory, but the information stored on disk is sufficient to allow full reconstruction of the data structure in memory. If it is determined that the data structure will no longer be used, it is removed from disk and from memory, if currently loaded therein.

As will be described in detail below, each column in a columnar data store may be logically split into a delta fragment and a main fragment. The delta fragment of a column is optimized for read and write access in disk and in memory, while the main column fragment is optimized for read access in disk and memory. According to some embodiments, each main column fragment is associated with an NVM block which stores large memory allocations of the main column fragment. Thus, when a main column fragment is loaded into memory, its large data structures are no longer allocated in DRAM and initialized from disk. Instead, the main column fragment being loaded locates its associated NVM block and points its large data structures directly into the NVM block.

As will be also be described below, the lifecycle of a main column fragment is driven by delta merges and DDLs. According to some embodiments, and regardless of how it is initiated, the creation of a new main column fragment triggers the creation of a new NVM block and the removal of a main column fragment triggers the removal of its NVM block. Also, if the removal of a main column fragment is undone, the removal of its associated NVM block is undone. Similarly, and according to some embodiments, if the creation of a main column fragment is undone, the creation of its associated NVM block is undone and the NVM block is removed. If the creation of a main column fragment is redone, the creation of its associated NVM block is also redone.

FIG. 1 is a block diagram of a system 100 according to some embodiments. System 100 includes database system 110, persistent storage 120, NVM 130, and client 140. According to some embodiments, database system 110, persistent storage 120 and NVM 130 may operate to serve transactional and analytical data to client 140 based on requests received therefrom.

Database system 110 may comprise any query-responsive database system that is now known, or later becomes known, in the art, including but not limited to a structured-query language (i.e., SQL) relational database management system. Database system 110 generally provides data to reporting clients, such as client 140, in response to instructions (e.g., SQL statements) received therefrom. In some embodiments, database system 110 receives an instruction from client 140. Database system 110 generates a statement execution plan based on the instruction and on stored metadata describing the data of the database. The statement execution plan is forwarded to storage layer of database system 110, which executes the plan and returns a corresponding dataset. Database system 110 then returns the dataset to client 140. Embodiments are not limited thereto.

Database system 110 may comprise an "in-memory" database, in which Random Access Memory (RAM) is used for cache memory and for storing the full database during operation. According to some embodiments, Dynamic Random Access memory (i.e., DRAM) may be used to store portions of the full database while NVM 130 is used to store other portions of the full database. As mentioned above, the portions stored by NVM 130 need not be reloaded after a database crash.

In some embodiments, the data of database system 110 may comprise one or more of conventional tabular data, row-based data stored in row format, column-based data stored in columnar format, and object-based data. Moreover, the data of database system 110 may be indexed and/or selectively replicated in an index to allow fast searching and retrieval thereof.

Persistent storage 120 may comprise one or more non-volatile data storage units (e.g., fixed disks) storing a relational database, a multi-dimensional database, an eXtendable Markup Language (i.e., XML) document, or any other structured and/or unstructured data. Persistent storage 120 may also store log volumes, data backups, and/or other suitable data. The data of persistent storage 120 may be distributed among several non-volatile data storage units. Embodiments are not limited to any number or types of non-volatile data storage units.

NVM 130 may be implemented using flash-based memory connected to a processor via Peripheral Component Interconnect Express (PCIe) interconnect technology, but other variants are known, including but not limited to 3D)(Point, Phase-change Random Access Memory, Magnetic Random Access Memory, and Memristors. NVM 130 may exhibit a Dual In-Line Memory Module (i.e., DIMM) form-factor and may therefore interface with a Central Processing Unit (i.e., CPU) of database system 110 as RAM (e.g., byte-addressable, directly accessible using load/store instructions, and covered by CPU cache-line handling, including cross-socket cache coherency) rather than as a block device. According to some implementations, the device latency of NVM 130 is close to that of DRAM and its bandwidth lower than that of DRAM.

Client 140 may comprise one or more devices executing program code of a software application for presenting user interfaces to allow interaction with data server 130. Presentation of a user interface may comprise any degree or type of rendering, depending on the type of user interface code generated by database system 110. For example, client 140 may execute a Web Browser to receive a Web page (e.g., in HTML (Hyper Text Mark-up Language) format) from database system 110, and may render and present the Web page according to known protocols. Client 140 may also or alternatively present user interfaces by executing a standalone executable file (e.g., an .exe file) or code (e.g., a Java applet) within a virtual machine.

Although embodiments are described with respect to database system 110, which reflects a "single node" database system, embodiments may also be implemented within one or more nodes of a distributed database, each of which comprises an executing process, a cache and a datastore. The data stored in the datastores of each node, taken together, represent the full database, and the database server processes of each node operate to transparently provide the data of the full database to the aforementioned database applications. Database system 110 may also or alternatively support multi-tenancy by providing multiple logical database systems which are programmatically isolated from one another.

Database tables include several values for each database record. The memory required to store the values may be reduced by storing smaller value IDs instead of the values themselves. In order to facilitate such storage, a dictionary is used which maps values into value IDs. Each unique value in the dictionary is associated with one unique value ID. Therefore, when a particular value is to be stored in a database record, the value ID for the value is determined from the dictionary and the value ID is stored in the record instead. To quickly determine rows containing a dictionary value, a secondary structure, or dictionary index, may be used. The dictionary index may be, for example, a hash map or tree-based map from value to value ID.

Figure 2A:
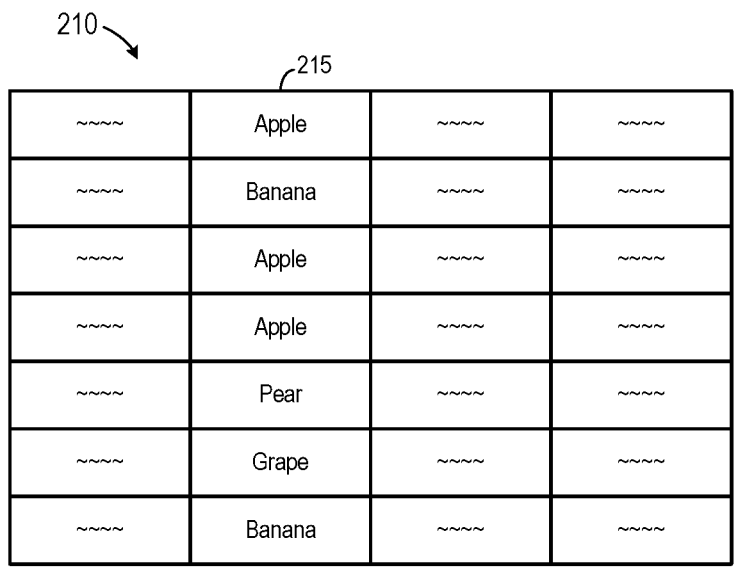
FIG. 2A illustrates a database table according to some embodiments.
Figure 2B:
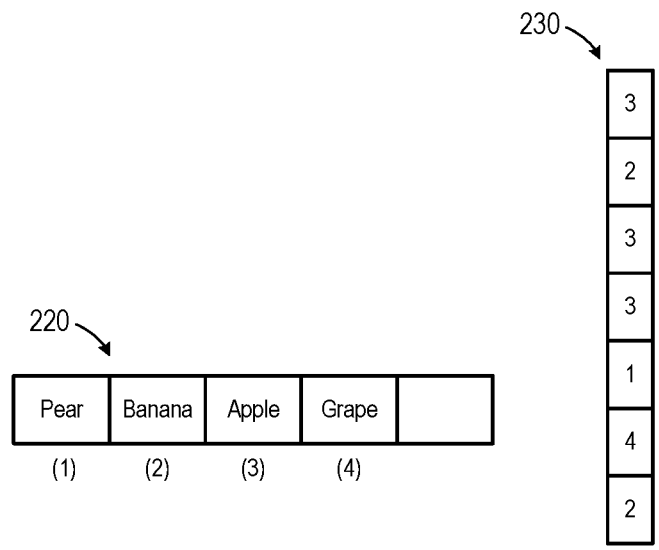
FIG. 2B illustrates a data dictionary and a column vector according to some embodiments.

FIG. 2A illustrates a table 210 according to some embodiments. Table 210 includes four columns, each of which includes various values. Dictionary 220 of FIG. 2B is associated with column 215 and used for encoding the values of column 215. Each vector element at position i of dictionary 220 stores the value associated with value ID i. That is, value "Pear" is associated with value ID 1, value "Banana" is associated with value ID 2, etc.

Vector 230 represents column 215 after being encoded based on dictionary 220. Specifically, each occurrence of value "Pear" has been replaced by value ID 1, each occurrence of value "Banana" has been replaced by value ID 2, each occurrence of value "Apple" has been replaced by value ID 3, and each occurrence of value "Grape" has been replaced by value ID 4. Storage of the values of vector 230 requires less storage space than storage of the values of column 215, and the stored values of vector 230 are more amenable to compression.

A sorted dictionary is suitable for storage of columnar data (e.g., since it supports direct binary search and does not require the overhead of a dictionary index) and reading of columnar data (e.g., since range queries are executed directly on integer value encodings, rather than actual domain's value lookup). Conversely, a sorted dictionary is not ideal for inserting new values into columnar data (e.g., since new values do not arrive in order and the dictionary would therefore require constant re-sorting).

To address this conflict, some embodiments store two "fragments" per columnar table. The "main" fragment is reader-friendly and the "delta" fragment is writer-friendly. Each fragment is stored using a different storage organization. According to some embodiments, the main fragment contains most of the data, and is stored using a sorted dictionary and advanced compression. The delta fragment contains a smaller portion of the data, and is stored using a non-sorted dictionary and N-bit compression. All new data is inserted into the delta fragment, and the data of the main fragment changes only during merges and other data reorganization processes.

According to some embodiments, snapshot isolation is implemented for both the main and the delta fragments using Multi-Version Concurrency Control (i.e., MVCC) structures. Queries access both fragments, and fragment deletion is a logical operation.

Figure 3:
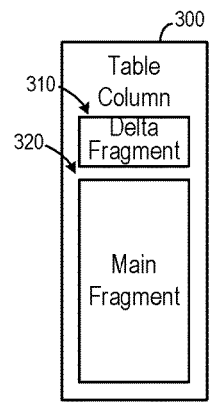
FIG. 3 illustrates a delta column fragment and a main column fragment of a database table column according to some embodiments.

A main table fragment includes a main fragment for each table column, and a delta table fragment includes a delta fragment for each table column. These fragments are referred to herein as a main column fragment and a delta table fragment, respectively. FIG. 3 illustrates a delta column fragment 310 and a main column fragment 320 associated with a table column 300.

Large tables may be physically partitioned (e.g., by hash, by range, etc.). For a table composed of m columns and n partitions, each column is associated with n main column fragments and n delta column fragments. Accordingly, the table is associated with m×n main column fragments and m×n delta column fragments.

According to some embodiments, a delta table fragment is merged into its associated main table fragment if it is determined that the delta table fragment has reached (or is about to reach) a predetermined threshold size. The threshold size may be statically or dynamically-configured, and may be table and/or partition-specific. The delta merge process is non-blocking to readers and writers, except for two short time windows at either end of the merge process.

Figure 4:
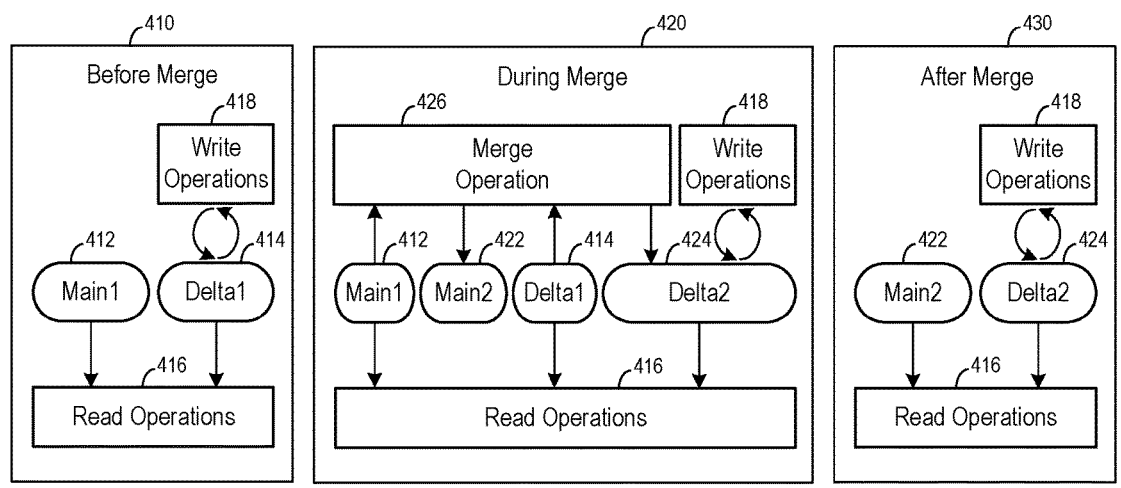
FIG. 4 illustrates a fragment merge operation according to some embodiments.

During a delta merge, new main column fragments and delta column fragments are created for each column. FIG. 4 illustrates the delta merge process for a particular column according to some embodiments. Box 410 illustrates runtime operation prior to the delta merge. As shown, main column fragment 412 and delta column fragment 414 each serve incoming read operations 416, and write operations 418 are served by delta column fragment 414.

Box 420 illustrates the merge process according to some embodiments. Merge operation 426 creates new empty delta column fragment 424 and directs write operations 418 thererto. Merge operation 426 also reads main column fragment 412 and delta column fragment 414 and creates new main column fragment 422 based thereon. Read operations 416 are served during this time by main column fragment 412, delta column fragment 414, and delta column fragment 424.

Upon success of the merge, as illustrated in box 430, main column fragment 412 and delta column fragment 414 are dropped. New delta column fragment 424 contains only rows inserted during the merge. New main column fragment 422 contains the data from main column fragment 412 and delta column fragment 414. If the delta merge is determined to have failed, the system reverts to main column fragment 412 and delta column fragment 414.

Received DDLs may result in creation of a new column, dropping of an existing column, or alteration of an existing column. New main and delta column fragments are created for new columns, and main and delta column fragments associated with dropped columns are logically deleted. For certain DDLs that alter an existing column (e.g., changes to the data type of a column), new associated main and delta column fragments are created. For other DDLs that alter an existing column (e.g., specification of a new default value for the column on inserts to the table), the delta and main column fragments associated with the column might not change.

Figure 5:
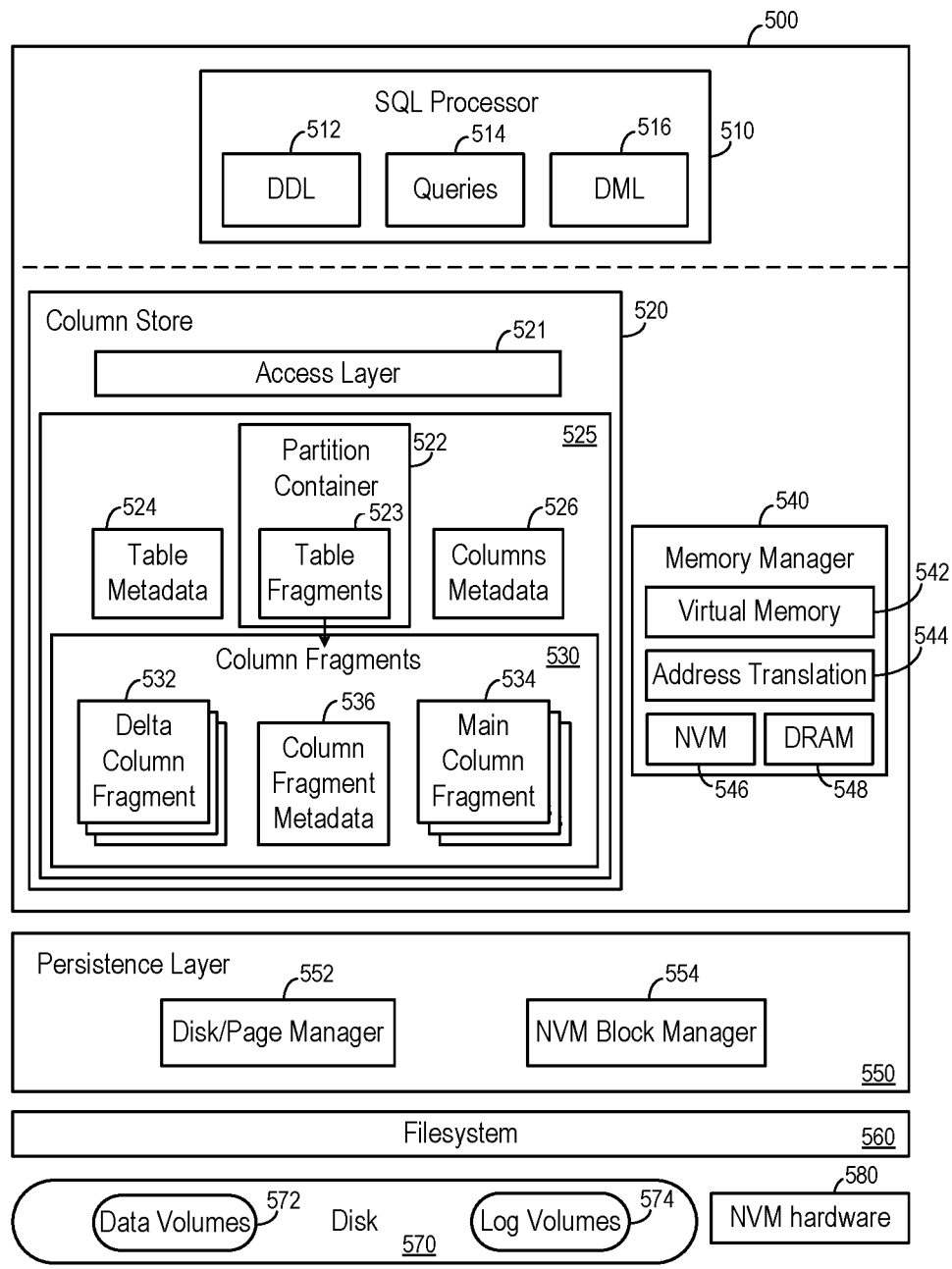
FIG. 5 is a block diagram of a database architecture system according to some embodiments.

FIG. 5 is a block diagram of a database architecture system 500 that is an implementation of database system 110, persistent storage 120 and NVM 130 of FIG. 1 in accordance with embodiments. Embodiments are not limited to the illustrated elements of FIG. 5. The illustrated elements may be implemented by any suitable combinations of hardware and software as is known in the art. Such combinations may include one or more processing units (microprocessors, central processing units, microprocessor cores, execution threads), one or more non-transitory storage media, and processor-executable software code.

Database architecture system 500 includes SQL processor 510, which receives SQL statements from one or more client systems as is known in the art (not shown). The SQL statements may include DDL statements, queries, and Data Manipulation Language statements, which may be handled by modules 512, 514 and 516, respectively.

In the case of received queries, such handling may require the retrieval of data from column store 520. Column store 520 stores tabular data of a database as is known in the art. DDLs may be handled by creating, deleting or altering a column of column store 520.

Column store 520 includes access layer 521 and store layer 525. Access layer 521 operates to retrieve data as defined by store layer 525. Access layer 521 includes in-memory representations of delta column fragments and main column fragments according to some embodiments. According to some embodiments, new column fragments are constructed by access layer 521 and persisted to NVM if appropriate.

A stored table may include one or more partitions as described above. Each partition is associated with a persisted partition container 522 of store layer 525. Within each partition container 522 are table fragments 523 (i.e., a delta table fragment and a main table fragment) for the associated table partition. Further, each table fragment 523 has corresponding delta column fragments 532 and main column fragments 534.

Partition containers 522 may be uniquely identified using a numeric value. The table fragments 523 within a partition container 522 are also uniquely identified, as are the delta column fragments 532 and main column fragments 534 which are associated therewith. In this regard, table metadata 524 may include a persistent table descriptor specifying, for each table partition, the partition number, the table name, the table identifier, etc. Columns metadata 526 may include a persistent column descriptor specifying, for each column of a table partition, a column identifier, a column name, a column type, an NVM-enabled flag, etc.

Each main column fragment 534 may be represented by a persistent column fragment descriptor and a paired transient object in column fragment metadata 536. The persistent descriptor may specify the column fragment's row count, table fragment identifier, column identifier, data and dictionary page chains, and may refer to other persistent descriptors through persistent pointers. The paired transient object points to the persistent column fragment descriptor, enriches the persistent column fragment descriptor's functionality and state, and refers to other transient objects through handles.

The persistent column fragment descriptor also specifies an NVMBlockID, which is a numeric identifier used to identify an NVM block associated with the corresponding main column fragment. The NVMBlockID is unique for the corresponding main column fragment. During operation as described below, a main column fragment NVM block key may be constructed as follows: NVM Block Key::=ContainerID '–' FragmentID '–' ColumnID '–' NVMBlockID, where ColumnID is the numeric identifier for the column, FragmentID is the numeric identifier for the main table fragment containing the main column fragment, and ContainerID is the numeric identifier for the table partition containing the main table fragment.

Column store 520 uses memory manager 540 to retrieve data from NVM 546 and DRAM 548. According to some embodiments, NVM 546 is used to store larger structures of the main column fragments, such as the dictionary and column vector backing arrays. Each main column fragment is associated with an NVM block containing its data. In some embodiments, smaller intermediate data structures (e.g., row counts of most-common values, access and usage statistics, bit vector of null values) of main column fragments are allocated in DRAM 548. All delta and MVCC data structures may be allocated in DRAM 548, as are intermediate results of query processing.

When a main column fragment is to be loaded into memory, access layer 521 requests, from store layer 525, information on whether or not the main column fragment stores data in NVM. The main column fragment checks its persistent column fragment descriptor to determine whether the main column fragment is associated with an NVMBlockID. If the main column fragment is associated with an NVMBlockID, access layer 521 requests for a pointer to the NVM block from store layer 525. Store layer 525 obtains the pointer to the NVM block via the main column fragment, which in turn constructs the NVM block key and obtains the pointer from memory manager 540. Memory manager 540 maps the NVM block into an address of virtual memory 542 via address translation 544. This address is passed back to access layer 521, which then points the index vector and dictionary of the in-memory representation of the main column fragment directly into the NVM block. If there is no NVM block associated with the column fragment, the in-memory index vector and dictionary are constructed by reading data from disk 570.

Each time the database starts, all the memory allocations (including those of the NVM blocks) are mapped to different addresses of virtual memory 542 via address translation 544. Since any pointer persisted in NVM would therefore need to be remapped after such a restart, some embodiments do not persist pointers in NVM. Notably, the large memory allocations stored in NVM according to some embodiments typically consist of the leaves of the column store data structures, and therefore do not include any pointers.

Persistence layer 550 includes a disk/page manager 552 to control a disk-based filesystem 560 for writing to and reading from data volumes 572 and log volumes 574 stored on disk 570. Similarly, persistence layer 550 includes a NVM block manager 554 to control an NVM-based filesystem to manage NVM blocks of NVM hardware 580 used to store columnar data. NVM 546 and NVM hardware 580 represent the same physical hardware and the separate depiction in FIG. 5 is to illustrate a conceptual relationship. Specifically, the relation is that NVM "files" 546 are mapped into the virtual memory 542 when the NVM blocks are loaded, and the contents of the NVM files are stored in NVM 580.

According to some embodiments, NVM Block Manager 554 facilitates consistent persistent memory management so that the upper database layers can efficiently exploit the persistent NVM space without having to consider allocation, deallocation, data durability, persistent memory leaks, and recovery of data after a restart. NVM Block Manager 554 is based upon memory-mapped files, thereby leveraging the load/store capabilities of persistent memory while also compatible with other storage technologies (e.g., Solid State Disks).

According to some embodiments, the implementation model of NVM Block Manager 554 is based on a root directory of the mounted filesystems. The root directory may be the location at which the persistent memory devices (i.e., DIMMs) are mounted. The physical location may be Direct Access (DAX)-enabled, which is a Linux® feature added for persistent memory storage. If supported, the DAX bypasses the kernel page cache which is usually used to buffer reads/writes into files.

For file-based mappings, the persistent memory space is mapped directly into a virtual memory 542. All the NVM-resident blocks are stored under the root directory and, at startup, these blocks are loaded from the same fixed directory. As the memory management is persistent, the NVM physical block lifecycle management is aligned with the savepoint logic of the database and is similarly initiated by a savepoint/restart/crash. Specifically, NVM Block Manager 554 keeps track of the savepoint version of the system at the time of creation of a new NVM block and uses the information to handle blocks during associated events (e.g., savepoint/restart/crash), which simplifies the corresponding handling of these events by the upper layers.

Figure 6:
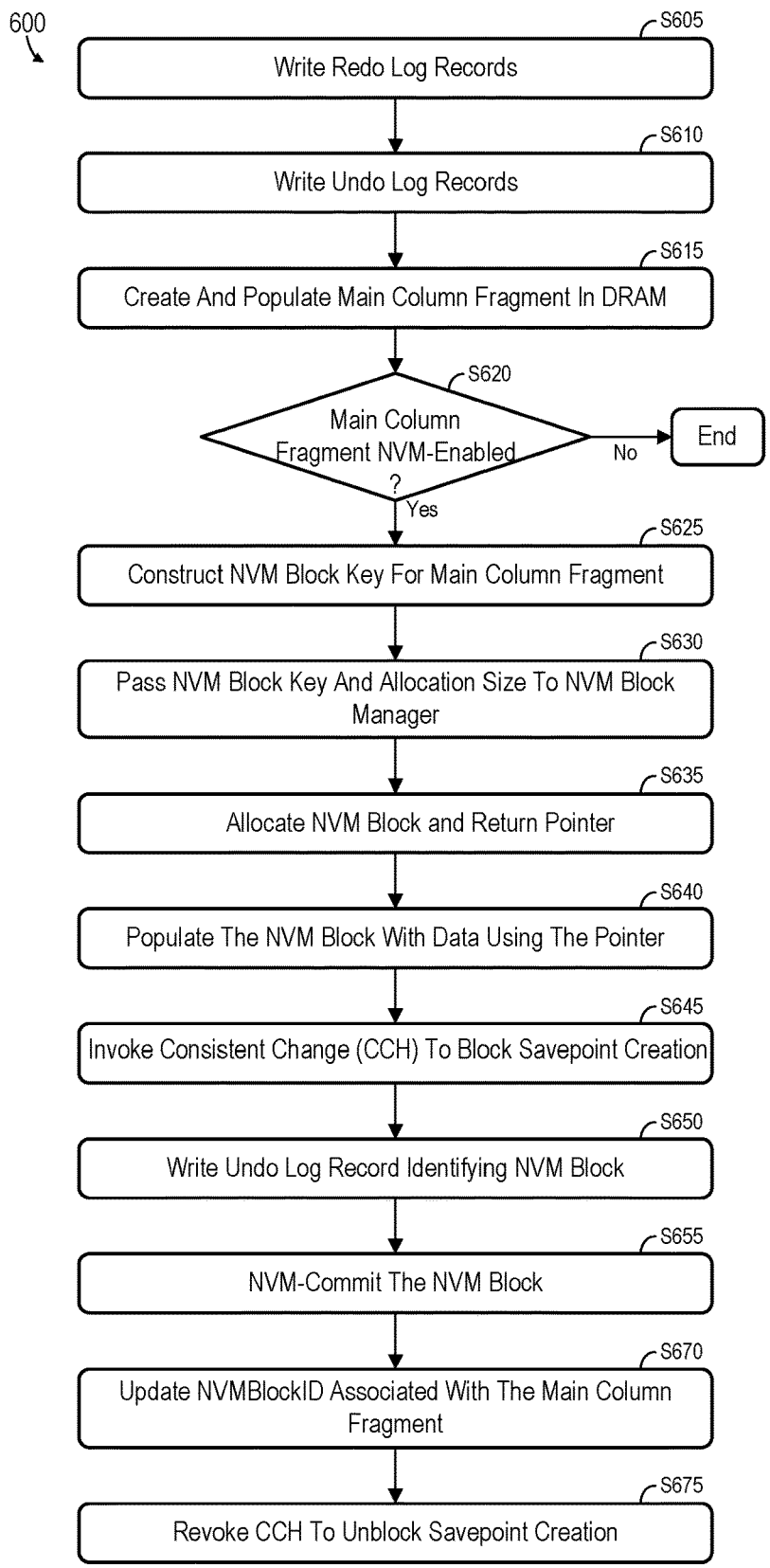
FIG. 6 comprises a flow diagram of a process to create a main column fragment according to some embodiments.

FIG. 6 comprises a flow diagram of process 600 to create a main column fragment and its associated NVM block according to some embodiments. In some embodiments, various hardware elements execute program code to perform process 600. Process 600 and all other processes mentioned herein may be embodied in processor-executable program code read from one or more of non-transitory computer-readable media, such as a floppy disk, a compact disc read-only memory (CD-ROM), a Digital versatile disc (DVD)-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Initially, at S605, redo log records are written to the persisted log volumes at the partition level for the creation of a main column fragment. Creation of a main column fragment may result from a delta merge operation (e.g., main column fragment 422 of FIG. 4), or from a received DDL. Next, at S610, undo log records are written to main memory at the partition level for the creation of the main column fragment. Usage of the log records for purposes of error handling and recovery will be described below.

The main column fragment is created and populated in memory at S615. According to some embodiments, access layer 521 (FIG. 5) constructs a main column fragment in DRAM 548 as part of a delta merge operation. For main column fragments, column fragment metadata 536 includes pointers to the disk pages that contain the data that is used to reconstruct the DRAM-stored structures. For delta fragments, column fragment metadata 536 includes the same pointer to disk pages that store data and also includes pointers to the in-memory DRAM-stored structures.

Next, at S620, it is determined whether the main column fragment is to be persisted in NVM or allocated in DRAM. According to some embodiments, access layer 521 performs this determination based on the "NVM enabled" field corresponding to the column in column metadata 526. If the determination is negative, process 600 terminates.

If it is determined that the main column fragment is to be persisted in NVM, an NVM block key is constructed at S625. According to some embodiments, the associated in-memory column representation of access layer 521 invokes a createNvmBlock method on the associated main column fragment 534 of column fragments 530. The main column fragment knows the FragmentID of its owning table fragment 523, which in turn knows the ContainerID of its own partition container 522. Accordingly, the NVM block key is constructed as ContainerID '–' FragmentID '–' ColumnID '–' NVMBlockID, where NVMBlockID is an incremented value of any NVMBlockID currently-associated with the main column fragment.

The main column fragment, at S630, passes the NVM Block Key and allocation size (in bytes) to NVM Block Manager 554 to allocate the NVM block. NVM Block Manager 554 allocates the block and returns a pointer to the block to the in-memory representation of the main column fragment in fragment access layer 521, at S635, which pointer is received by the in-memory representation of the main column fragment. Using the pointer, the in-memory main column fragment populates the NVM block with the data of the main column fragment, at S640.

At this point of process 600, the NVM block is not yet NVM-committed. The NVM block will therefore not persist after a database crash or a failure of the operation (e.g., DDL or delta merge) for which the main column fragment is being created.

Accordingly, once the NVM block is populated, the in-memory main column fragment notifies the corresponding main column fragment 534 of column fragments 536. In response, a CCH (i.e., consistent change) is invoked at S645. A CCH is a mechanism used to block the database from creating a savepoint. In other words, a savepoint cannot run while a CCH is active.

Within the single CCH, an undo log record ("undoCreateNvmBlock") is written at S650 containing the NVM-BlockID, ColumnID, FragmentID, and ContainerID. The undo log record therefore identifies the NVM block. Also within the same CCH, the NVM block is NVM-committed at S655 by NVM Block Manager 554 and the NVMBlockID in the persistent descriptor for the main column fragment is updated at S670 to the NVMBlockID used to construct the NVM block key for the NVM block. Savepoint creation is unblocked at S675, by revoking the CCH according to the present example.

An NVM block will be NVM-committed at most once, and once committed it will not be modified. Accordingly, after S675, it is guaranteed that the NVM block will exist for the life of the main column fragment or until it is replaced by a new NVM block due to a change in the data representation of the main column fragment.

Moreover, memory manager 540 guarantees that NVM-committed NVM blocks that exist at a savepoint persist after a restart (i.e., each NVM-committed and savepointed block exists and its contents are the same as at the time the NVM block was NVM-committed). Similarly, blocks that have been created but not committed, and blocks that have been committed but not have been covered by a savepoint, are physically removed by memory manager 540 during recovery from a crash.

A main column fragment and its associated NVM block can be created independently. Only the writing of the "undoCreateNvmBlock" undo log record, the NVM-commit and the association of NVM block to the main column fragment are to occur within a single CCH.

Error and crash recovery handling in view of the above-described creation and population of an NVM block will now be described.

Figure 7:
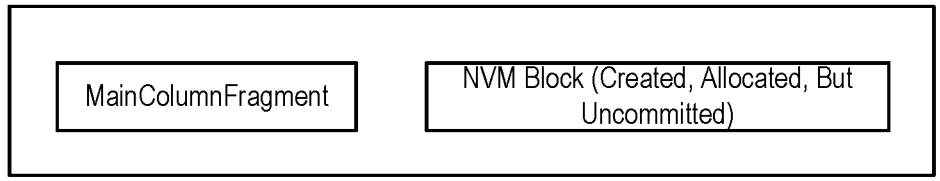
FIG. 7 illustrates a main column fragment and associated NVM block during NVM block creation according to some embodiments.

Referring to FIG. 7, it is assumed that a main column fragment and what will be its NVM block have been created. The NVM block has been allocated in NVM but has not yet been populated or NVM-committed. If a crash occurs at this point, memory manager 540 reclaims the NVM block as part of the recovery. Specifically, memory manager 540 guarantees that an NVM block which has not been NVM-committed is deallocated/reclaimed in case of a crash. If the operation that created the main column fragment and its NVM block needs to abort (e.g., due to an exception), an NVM BlockHandle, which is obtained when an NVM block is created, is marked by default such that the NVM block is dropped on destruction of the NVM BlockHandle if there was no explicit commit via a NVM-block modification scope.

Figure 8:
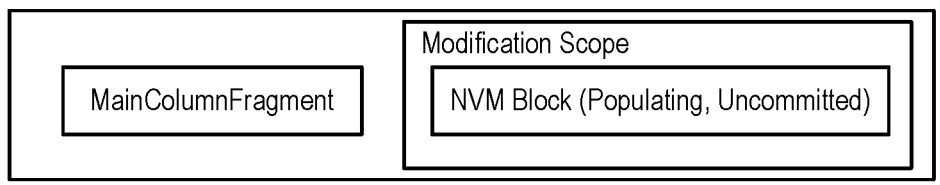
FIG. 8 illustrates the main column fragment and associated NVM block of FIG. 7 while writing to the NVM block according to some embodiments.

In this regard, FIG. 8 illustrates use of a NVM-modification scope while writing to the NVM block. The NVM-modification scope is required to NVM-commit the NVM block according to some embodiments. Memory manager 540 reclaims the NVM block as part of the recovery in case of a crash. If the write operation fails, the NVM block will be physically removed in response to destruction of the NVM BlockHandle obtained at block creation time, because the NVM-modification scope never committed the NVM block.

Figure 9:
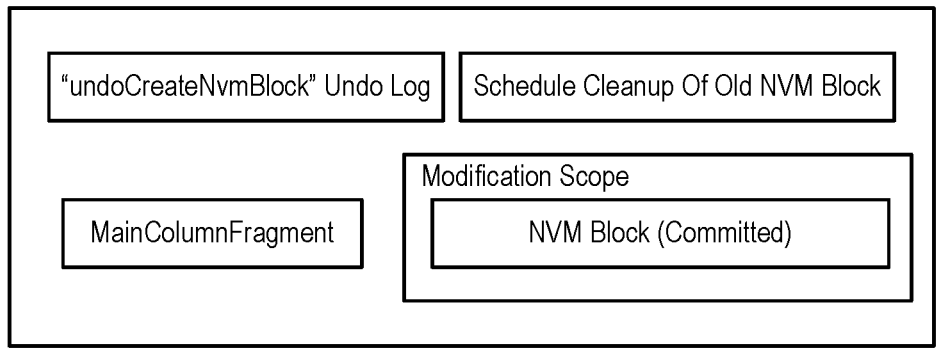
FIG. 9 illustrates the main column fragment and associated NVM block of FIG. 7 during the commit and association of the NVM block according to some embodiments.

FIG. 9 illustrates the NVM-commit of the NVM block and its association to a main column fragment occurring within the same CCH. Within the CCH, cleanup is scheduled such that the old NVM block being replaced (if any) is removed after commit of the operation that triggered the creation of the new NVM block. If the database crashes at this point, the undo log record was not savepointed and NVM block manager 554 will simply take care of reclaiming the NVM block. Because changes to the main column fragment were not persisted by a savepoint, the main column fragment will still be associated with the NVM block prior to the creation of the new NVM block.

If the crash happens after the CCH and the actions executed within the CCH were savepointed, processing of the undo log record reverts the change to the main column fragment's NVMBlockID and logically deletes the new NVM block. If the transaction that caused the creation of the main column fragment and NVM block is rolled back, the undo log record for the transaction is acted upon. Specifically, the change to the column fragment's NVMBlockID is reverted and the new NVM block is logically deleted.

Main column fragments may be removed at cleanup of a transaction that has removed the column (e.g., alter table drop column), at cleanup of the transaction that has removed the fragment containing the main column fragment (e.g., removal of the old main fragment after a delta to main merge), or at undo, during rollback of the transaction that created the main column fragment. When a main column fragment is removed (e.g., because the corresponding column is deleted), a logical removal of the NVM block is done via a callback mechanism that is invoked for each structure owned by the main column fragment at the time of its removal. Specifically, when this callback is invoked for removal of the NVM block, an NVM block delete operation of memory manager 540 is invoked and the NVMBlockID in the descriptor of the associated main column fragment is cleared by setting its value to 0. Physical removal of logically-removed NVM blocks occurs at a next savepoint.

Cleanup may comprise an asynchronous process to physically remove persisted structures, both in disk and in NVM. Operations (e.g., dropping of a column) schedule corresponding actions (e.g., physical removal of the column fragments) that are to occur at cleanup. When it is guaranteed that there are no transactions in the system that may still view the affected object (e.g., the dropped column), the scheduled cleanup actions are executed. The cleanup process therefore advances as transactions complete. The changes (both on disk and NVM) performed by the cleanup are persisted at a next savepoint.

When an NVM block has been logically removed and the server crashes before the logical removal is savepointed, memory manager 540 guarantees the block is not removed during recovery and the logical delete operation is discarded.

NVM Blocks can be deleted if the corresponding main column fragment is not removed. Accordingly, a main column fragment may be associated with different NVM blocks throughout its life. For example, if the data of the main column fragment is reorganized for better compression, no new main column fragment is created. Rather, the current NVM block associated to the main column fragment is deleted and a new NVM block is created as described above. In another case, if the main column fragment is repopulated (i.e., its data representation changes), a new NVM block key is constructed as previously described but with an incremented NVMBlockId. Accordingly, a new NVM block is created and populated based on the new NVM block key, the "undoCreateNvmBlock" log record is written within a single CCH as previously described, and the old NVM block is scheduled to be deleted by the cleanup mechanism. Also, within the same CCH, the NVM block is NVM-committed and the NVMBlockId in the persistent descriptor of the main column fragment is updated.

If the transaction (i.e., reorganization or repopulation) is committed at this point, the old NVM block is deleted and the new NVM block will exist for the life of the main column fragment or until it is replaced. The removal of the old NVM block is guaranteed by the previously-described cleanup mechanism. Moreover, if the transaction is rolled back, the new NVM block is discarded and the old NVM block is re-established as the NVM block for the main column fragment by changing its corresponding persistent descriptor to again reflect the old NVM block via an undo mechanism.

According to some embodiments, NVM blocks are not logically deleted inline to the execution of an operation (e.g., drop column), because old readers may be reading the old NVM block and, if the block is logically deleted and the block deletion is savepointed, the NVM block will be lost and the operation cannot rollback. Therefore, a main column fragment's NVM blocks are logically deleted at the cleanup or undo of the operation.

As described above, NVM blocks that have not been NVM-committed do not persist after a crash. This guarantees that allocated NVM blocks which are not yet committed are not leaked after a crash. Also, NVM blocks that have been NVM-committed, but for which the NVM-commit has not been covered by a savepoint, are deleted during crash recovery. This guarantees NVM blocks are not leaked when a high-level operation (e.g., add column, merge) creates an NVM block but the undo of the operation is not persisted.

The delta merge described above may not be durable unless all the modifications made by the merge and the commit of the merge transaction are savepointed. Actions performed by a delta merge are therefore undone after a crash if the commit of the merge was not followed by a savepoint prior to the crash. When an NVM block has been logically deleted and this logical delete has not been savepointed, and assuming the NVM-commit of the NVM block has been savepointed, the NVM block persists after a crash and the request to delete the NVM block is discarded by NVM block manager 554. This guarantees that column fragments contained in the re-established main fragment after the undo of the merge will be associated with valid NVM blocks.

In a case that an NVM block has been logically deleted and this logical deletion has not been savepointed, and assuming the NVM-commit of the NVM block has been savepointed, the NVM block persists after a crash and the request to delete the NVM block is discarded by memory manager 540. This guarantees non-logged transactions (merge) can be undone after the crash, and the main column fragments contained in the re-established main fragment have valid NVM blocks.

Similarly, if the NVM-commit of a block has been savepointed, then the NVM block persists after a crash. Whether or not to keep the NVM block will be determined during recovery based on whether or not the transaction is undone (i.e., if the NVM block is not to be kept, the logical removal will be triggered by the undo handling executed for the transaction). If a logical removal of an NVM block has been savepointed, then the NVM block does not persist after a crash because, due to the savepoint, the logical removal cannot be redone.

Memory manager 540 also provides for logical deletion of a committed NVM block. Further, the NVM BlockHandle obtained when creating a block guarantees that the associated NVM block is removed when the handle goes out of scope, unless a block modification scope was obtained and the NVM block was explicitly committed.

Figure 10:
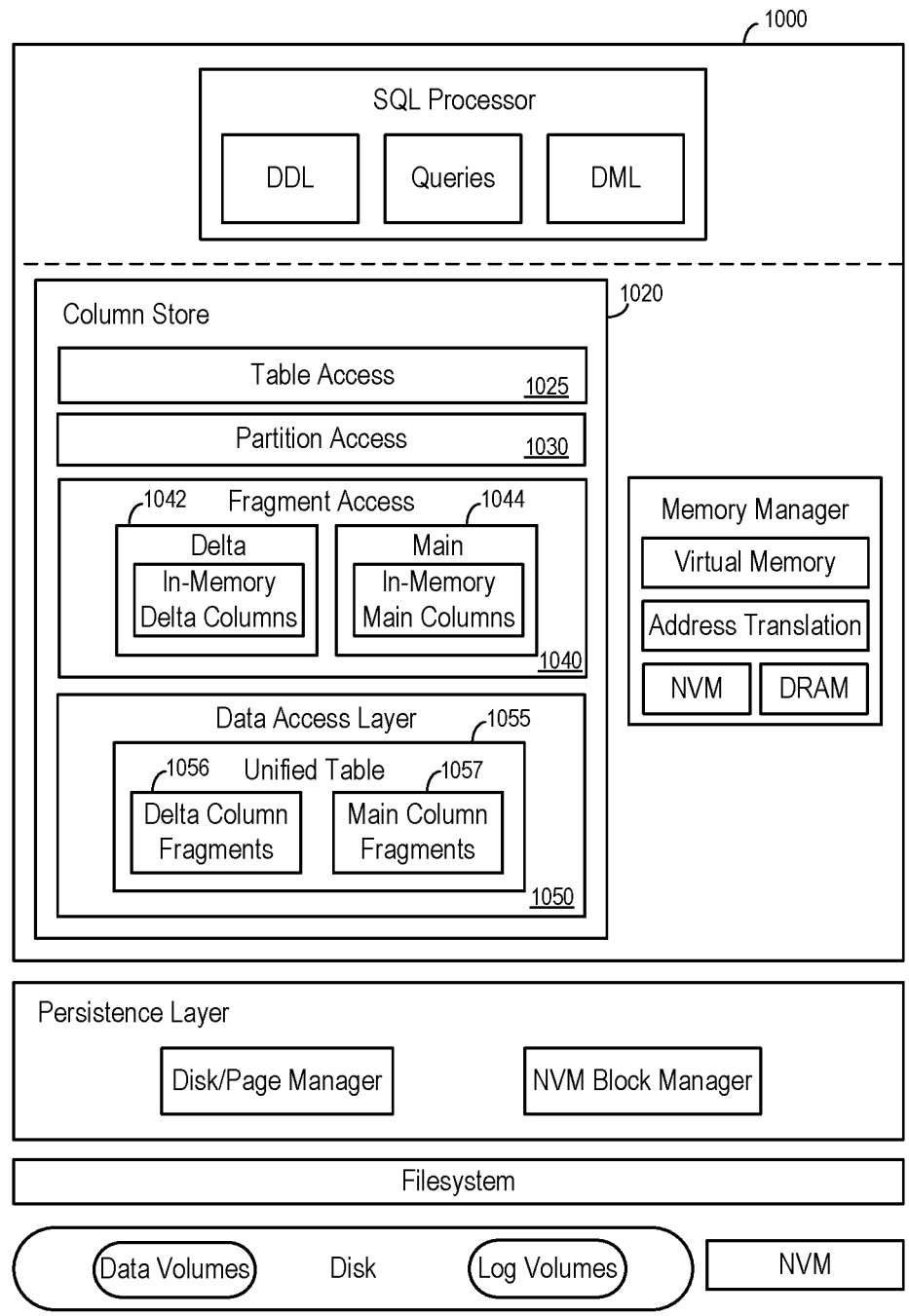
FIG. 10 is a block diagram of a database architecture according to some other embodiments.

FIG. 10 is a block diagram of a database architecture system 1000 according to some embodiments. Database architecture system 1000 may comprise an implementation of database architecture system 500 of FIG. 5 and/or an implementation of database system 110, persistent storage 120 and NVM 130 of FIG. 1.

Column store 1020 of database architecture system 1000 provides additional detail of access layer 521 of database architecture system 500 according to some embodiments. Specifically, access layer 521 is implemented by table access 1025, partition access 1030 and fragment access 1040. As described above with respect to access layer 521, fragment access 1040 includes in-memory representations 1042 of delta columns and in-memory representations 1044 of main columns.

Figure 11:
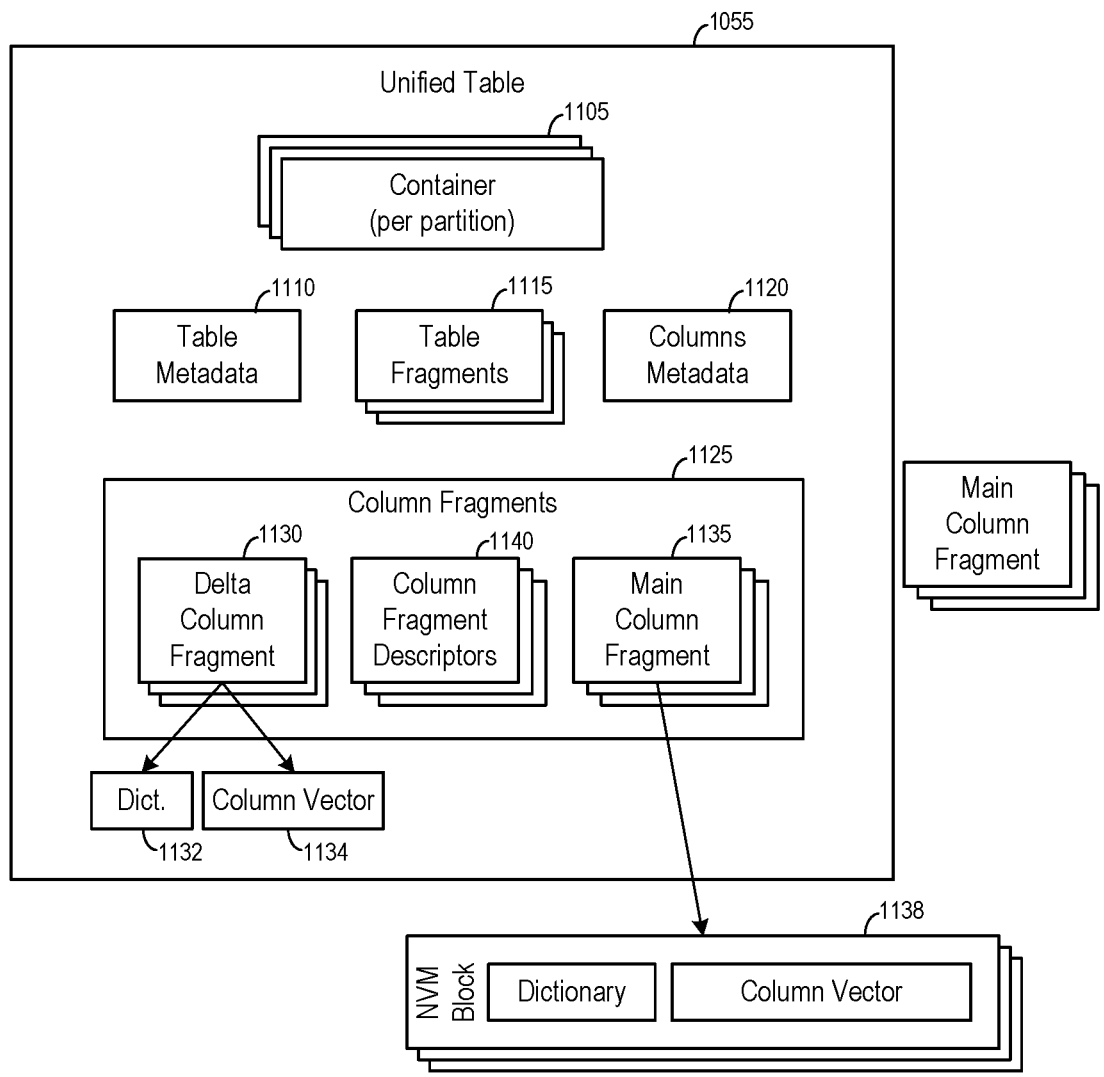
FIG. 11 is a block diagram of a portion of a database architecture according to some embodiments.

Store layer 525 of database architecture system 500 may be implemented by data access layer 1050, in which unified table 1055 includes delta column fragments 1056 and main column fragments 1057 as described above with respect to delta column fragments 532 and main column fragments 534, respectively. FIG. 11 is a detailed illustration of an architecture of a unified table 1055 according to some embodiments.

FIG. 11 illustrates partition containers 1105, table metadata 1110, table fragments 1115 and columns metadata 1120, each of which may be as described above with respect to partition container 522, table metadata 524, table fragments 523 and columns metadata 526. Similarly, column fragments 1125, including delta column fragments 1130, main column fragments 1135 and column fragment descriptors 1140, may be implemented as described above with respect to column fragments 530, including delta column fragments 532, main column fragments 534 and column fragment descriptors 536, respectively. As also described above, each delta column fragment 1130 points to its respective dictionary 1132 and column vector 1134 in DRAM, while each main column fragment 1135 logically points to its respective NVM block (i.e., if the associated column is "NVM-enabled"), in that each main column fragment 1135 knows how to construct an NVM block key and includes functionality to obtain a virtual address pointer to the associated NVM block (e.g., using memory manager 540 as described above). A main column fragment 1135 is unaware of the data within its NVM block, as the in-memory representation of the main column fragment interprets the contents of the NVM block.

Figure 12:
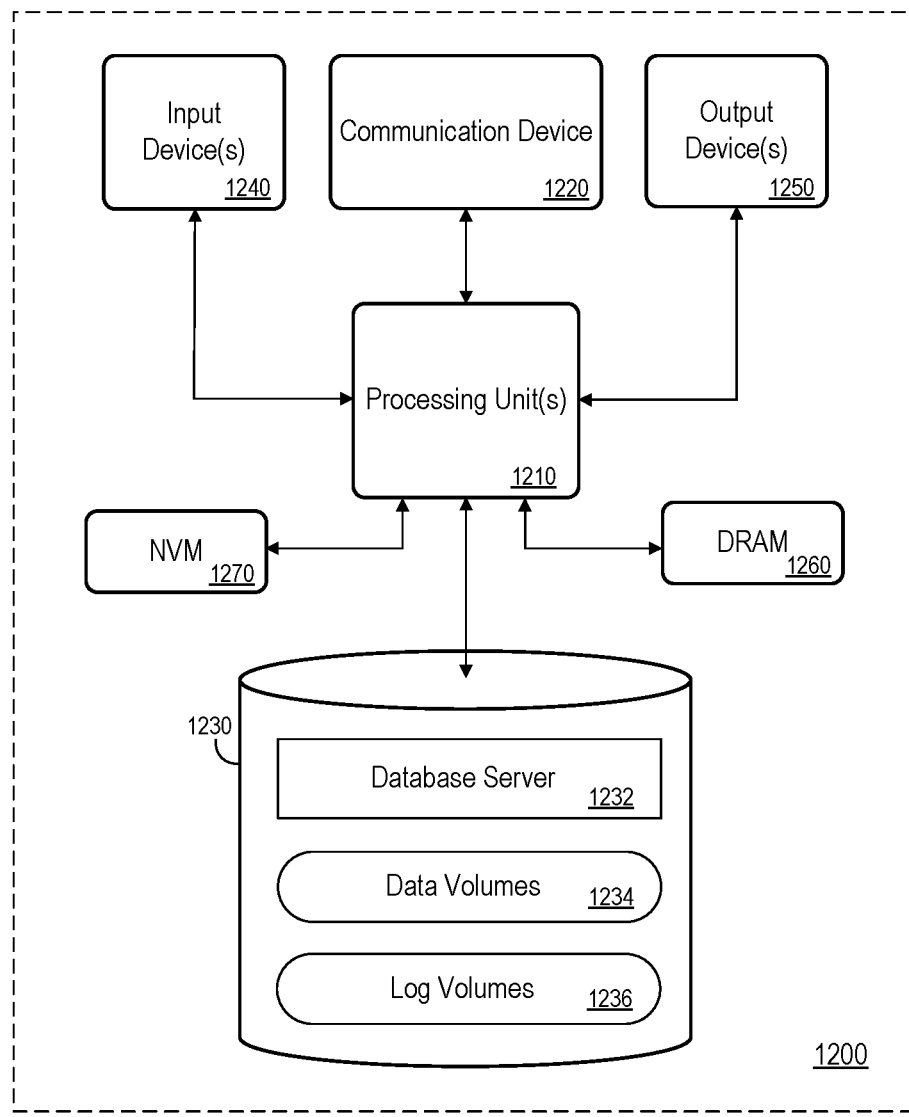
FIG. 12 is a block diagram of an apparatus including processing units, DRAM, and a data storage device according to some embodiments.

FIG. 12 is a block diagram of an apparatus 1200 according to some embodiments. Apparatus 1200 may comprise a general-purpose computing apparatus and may execute program code to perform any of the functions described herein. Apparatus 1200 may comprise an implementation of database architecture system 500 of FIG. 5, database architecture system 1000 of FIG. 10 and/or of database system 110, persistent storage 120 and NVM 130 of FIG. 1 in some embodiments. Apparatus 1200 may include other unshown elements according to some embodiments.

Apparatus 1200 includes processing unit(s) 1210 operatively coupled to communication device 1220, data storage device 1230, one or more input devices 1240, one or more output devices 1250 and DRAM 1260. Communication device 1220 may facilitate communication with external devices, such as a reporting client, or a data storage device. Input device(s) 1240 may comprise, for example, a keyboard, a keypad, a mouse or other pointing device, a microphone, knob or a switch, an infra-red (IR) port, a docking station, and/or a touch screen. Input device(s) 1240 may be used, for example, to enter information into apparatus 1200. Output device(s) 1250 may comprise, for example, a display (e.g., a display screen) a speaker, and/or a printer.

Data storage device 1230 may comprise any appropriate persistent storage device, including combinations of magnetic storage devices (e.g., magnetic tape, hard disk drives and flash memory), optical storage devices, Read Only Memory (ROM) devices, etc. Data storage device 1230 may be implemented using one or more arrays of storage devices, one or more of which may be remote from one another.

Database server 1232 may comprise program code executed by processing unit(s) 1210 to cause apparatus 1200 to perform any one or more of the processes described herein, including but not limited creating the runtime structures of FIG. 5 and/or FIG. 10 in DRAM 120 and/or NVM 1270. Embodiments are not limited to execution of these processes by a single apparatus. Data volumes 1234 may include conventional database data and metadata as described above, while log volumes 1236 may comprise log data as is known in the art.

Data storage device 1230 may also store data and other program code for providing additional functionality and/or which are necessary for operation of apparatus 1200, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of system 100 may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Elements described herein as communicating with one another are directly or indirectly capable of communicating over any number of different systems for transferring data, including but not limited to shared memory communication, a local area network, a wide area network, a telephone network, a cellular network, a fiber-optic network, a satellite network, an infrared network, a radio frequency network, and any other type of network that may be used to transmit information between devices. Moreover, communication between systems may proceed over any one or more transmission protocols that are or become known, such as Asynchronous Transfer Mode (ATM), Internet Protocol (IP), Hypertext Transfer Protocol (HTTP) and Wireless Application Protocol (WAP).

Embodiments described herein are solely for the purpose of illustration. Those in the art will recognize other embodiments may be practiced with modifications and alterations to that described above.

What is claimed is:

1. A system comprising:
   a first non-volatile memory system storing processor-executable instructions; and
   a processor configured to execute the processor-executable instructions to cause the processor to:
   create a first fragment of a first database column in a volatile memory system;
   receive a first pointer to a first block of non-volatile memory system, the first block associated with the first fragment of the first database column;
   populate the first block of the non-volatile memory system using the first pointer;
   block creation of a database savepoint;
   while blocking creation of a database savepoint, commit the first block of the non-volatile memory and associate a first block identifier of the first block of the non-volatile memory with the first fragment of the first database column; and
   unblock creation of the database savepoint.

2. The system according to claim 1, wherein the processor is further configured to execute the processor-executable instructions to cause the processor to:
   generate a first block key associated with the first fragment of the first database column, the first block key comprising the first block identifier of the first block, an identifier of the first database column, an identifier of a first table of the first database column, and an identifier of a first partition of the first fragment of the first database column.

3. The system according to claim 2, wherein the processor is further configured to execute the processor-executable instructions to cause the processor to:
   determine an allocation size based on the created first fragment of the first database column; and
   pass the first block key and the allocation size to a non-volatile memory block manager,
   wherein the first pointer is received from the non-volatile memory block manager.

4. The system according to claim 2, wherein the processor is further configured to execute the processor-executable instructions to cause the processor to:
   create a second fragment of the first database column in the volatile memory system,
   wherein the first fragment is a main column fragment and comprises a first dictionary and a first column vector,
   wherein the second fragment is a delta column fragment and comprises a second dictionary and a second column vector, and
   wherein the first dictionary is a sorted dictionary and the second dictionary is a non-sorted dictionary.

5. The system according to claim 1, wherein the processor is further configured to execute the processor-executable instructions to cause the processor to:
   create a second fragment of the first database column in the volatile memory system,
   wherein the first fragment is a main column fragment and comprises a first dictionary and a first column vector,
   wherein the second fragment is a delta column fragment and comprises a second dictionary and a second column vector, and
   wherein the first dictionary is a sorted dictionary and the second dictionary is a non-sorted dictionary.

6. The system according to claim 1, wherein the first fragment of the first database column is created based on a prior main fragment of the first database column and a prior delta fragment of the first database column.

7. The system according to claim 6, wherein the prior main fragment of the first database column is associated with a second block identifier of a second block of the second non-volatile memory.

8. The system according to claim 1, wherein the processor is further configured to execute the processor-executable instructions to cause the processor to:
   create a first fragment of a second database column in the volatile memory system;
   receive a second pointer to a second block of the second non-volatile memory system, the second block associated with the first fragment of the second database column;
   populate the second block of the second non-volatile memory system using the second pointer;
   while blocking creation of a database savepoint, commit the second block of the second non-volatile memory and associate a second block identifier of the second block of the second non-volatile memory with the first fragment of the second database column.

9. The system according to claim 8, wherein the processor is further configured to execute the processor-executable instructions to cause the processor to:
   generate a first block key associated with the first fragment of the first database column, the first block key comprising the first block identifier of the first block, an identifier of the first database column, an identifier of a first table of the first database column, and an identifier of a first partition of the first fragment of the first database column;
   generate a second block key associated with the second fragment of the first database column, the second block key comprising the identifier of the first database column, the identifier of a first table of the first database column, and an identifier of a second partition of the second fragment of the first database column; and
   pass the first block key and the second block key to a non-volatile memory block manager,
   wherein the first pointer and the second pointer are received from the non-volatile memory block manager.

10. The system according to claim 1, wherein the processor is further configured to execute the processor-executable instructions to cause the processor to:
    receive a second pointer to a second block of the second non-volatile memory system;
    populate the second block of the second non-volatile memory system using the second pointer;
    block creation of a database savepoint;
    while database savepoint creation is blocked, commit the second block of the second non-volatile memory, associate a second block identifier of the second block of the second non-volatile memory with the first fragment of the first database column, and schedule deletion of the first block of the second non-volatile memory system; and
    unblock creation of the database savepoint.

11. The system according to claim 10, wherein the processor is further configured to execute the processor-executable instructions to cause the processor to:
    while database savepoint creation is blocked, schedule an undo of creation of the second block and of association of the second block identifier of the second block with the first fragment of the first database column.

12. The system according to claim 11, wherein the processor is further configured to execute the processor-executable instructions to cause the processor to:
    execute the undo to delete the second block and to associate the first block identifier of the first block with the first fragment of the first database column.

13. A computer-implemented method, comprising:
    creating a first fragment of a first database column in a volatile memory system;
    receiving a first pointer to a first block of a second non-volatile memory system, the first block associated with the first fragment of the first database column;
    populating the first block of the second non-volatile memory system using the first pointer;
    while blocking creation of a database savepoint, committing the first block of the second non-volatile memory and associating a first block identifier of the first block of the second non-volatile memory with the first fragment of the first database column; and
    unblocking creation of the database savepoint.

14. The method according to claim 13, further comprising:
    generating a first block key associated with the first fragment of the first database column, the first block key comprising the first block identifier of the first block, an identifier of the first database column, an identifier of a first table of the first database column, and an identifier of a first partition of the first fragment of the first database column;
    determining an allocation size based on the created first fragment of the first database column; and passing the first block key and the allocation size to a non-volatile memory block manager,
wherein the first pointer is received from the non-volatile memory block manager.

15. The method according to claim 13, further comprising:
creating a second fragment of the first database column in the volatile memory system,
wherein the first fragment is a main column fragment and comprises a first dictionary and a first column vector,
wherein the second fragment is a delta column fragment and comprises a second dictionary and a second column vector, and
wherein the first dictionary is a sorted dictionary and the second dictionary is a non-sorted dictionary.

16. The method according to claim 13, further comprising:
creating a first fragment of a second database column in the volatile memory system;
receiving a second pointer to a second block of the second non-volatile memory system, the second block associated with the first fragment of the second database column;
populating the second block of the second non-volatile memory system using the second pointer;
while blocking creation of a database savepoint, committing the second block of the second non-volatile memory and associating a second block identifier of the second block of the second non-volatile memory with the first fragment of the second database column.

17. The method according to claim 13, further comprising:
receiving a second pointer to a second block of the second non-volatile memory system;
populating the second block of the second non-volatile memory system using the second pointer;
blocking creation of a database savepoint;
while database savepoint creation is blocked, committing the second block of the second non-volatile memory and associating a second block identifier of the second block of the second non-volatile memory with the first fragment of the first database column; and
unblocking creation of the database savepoint.

18. The method according to claim 17, further comprising:
while database savepoint creation is blocked, scheduling an undo of creation of the second block and of association of the second block identifier of the second block with the first fragment of the first database column; and
executing the undo to delete the second block and to associate the first block identifier of the first block with the first fragment of the first database column.

19. A non-transitory computer-readable medium storing processor-executable instructions, which when executed by a processor cause the processor to:
create a first fragment of a first database column in a volatile memory system;
receive a first pointer to a first block of a second non-volatile memory system, the first block associated with the first fragment of the first database column;
populate the first block of the second non-volatile memory system using the first pointer;
while blocking creation of a database savepoint, commit the first block of the second non-volatile memory and associate a first block identifier of the first block of the second non-volatile memory with the first fragment of the first database column; and
unblock creation of the database savepoint.

20. The medium according to claim 19, wherein the processor-executable instructions, when executed, further cause the processor to:
create a first fragment of a second database column in the volatile memory system;
receive a second pointer to a second block of the second non-volatile memory system, the second block associated with the first fragment of the second database column;
populate the second block of the second non-volatile memory system using the second pointer;
while blocking creation of a database savepoint, commit the second block of the second non-volatile memory and associate a second block identifier of the second block of the second non-volatile memory with the first fragment of the second database column.

21. The medium according to claim 19, wherein the processor-executable instructions, when executed, further cause the processor to:
create a second fragment of the first database column in the volatile memory system;
receive a second pointer to a second block of the second non-volatile memory system, the second block associated with the second fragment of the first database column;
populate the second block of the second non-volatile memory system using the second pointer;
while blocking creation of a database savepoint, commit the second block of the second non-volatile memory and associate a second block identifier of the second block of the second non-volatile memory with the second fragment of the first database column.

22. The medium according to claim 19, wherein the processor-executable instructions, when executed, further cause the processor to:
receive a second pointer to a second block of the second non-volatile memory system;
populate the second block of the second non-volatile memory system using the second pointer;
block creation of a database savepoint;
while database savepoint creation is blocked, commit the second block of the second non-volatile memory and associate a second block identifier of the second block of the second non-volatile memory with the first fragment of the first database column; and
unblock creation of the database savepoint.

* * * * *